United States Patent [19]
Keller

[11] Patent Number: 6,144,566
[45] Date of Patent: Nov. 7, 2000

[54] STANDBY POWER SUPPLY FOR VIDEO DISPLAY APPARATUS

[75] Inventor: Anton Werner Keller, Arni, Switzerland

[73] Assignee: Thomson Licensing, S.A., Boulogne, Cedex, France

[21] Appl. No.: 09/297,415

[22] PCT Filed: Nov. 13, 1997

[86] PCT No.: PCT/IB97/01431

§ 371 Date: Apr. 29, 1999

§ 102(e) Date: Apr. 29, 1999

[87] PCT Pub. No.: WO98/21886

PCT Pub. Date: May 22, 1998

[30] Foreign Application Priority Data

Nov. 13, 1996 [GB] United Kingdom .................. 9623612

[51] Int. Cl.[7] ............................................... H02M 3/335
[52] U.S. Cl. ................................................ 363/21
[58] Field of Search ............................. 363/16, 20, 21, 363/49, 95, 97, 131

[56] References Cited

U.S. PATENT DOCUMENTS

| | | | |
|---|---|---|---|
| 4,751,580 | 6/1988 | Fitzgerald et al. ................ | 358/190 |
| 5,689,407 | 11/1997 | Marinus et al. .................... | 363/21 |
| 5,812,383 | 9/1998 | Majid et al. ....................... | 363/21 |
| 5,852,550 | 12/1998 | Majid et al. ....................... | 363/21 |

FOREIGN PATENT DOCUMENTS

| | | |
|---|---|---|
| 3223756 | 6/1982 | Germany . |
| 6-225529 | 8/1994 | Japan . |

OTHER PUBLICATIONS

*Patent Abstracts of Japan, vol. 018, No. 595, Nov. 14, 1994 & JP 6–225529.

*Primary Examiner*—Matthew Nguyen
*Attorney, Agent, or Firm*—Joseph S. Tripoli; Joseph J. Laks; Joseph J. Kolodka

[57] ABSTRACT

A switched mode power supply circuit for a video display apparatus having run and standby modes of operation A run mode power supply provides an output voltage for the video display apparatus during the run mode of operation. A standby mode power supply provides an output voltage for the video display apparatus during the standby mode of operation. A switched mode power supply controller circuit provides drive pulses to the run mode power supply during the run mode and to the standby mode power supply during the standby mode. A snubber circuit of the standby power supply is used to turn off a start-up transistor during the standby mode of operation to prevent power dissipation in a start-up resistor.

28 Claims, 3 Drawing Sheets

STANDBY POWER SUPPLY FOR VIDEO DISPLAY APPARATUS

BACKGROUND

1. Field of the Invention

This invention relates generally to the field of power supplies, and, in particular, to standby mode power supplies for video display apparatus such as, for example, television receivers.

2. Background Information

The power consumption of a video display apparatus may approach, or even exceed, approximately ten watts during standby mode operation. At a time of heightened governmental concern regarding energy efficiency standards for electronic equipment, such a level of standby power consumption poses a concern. For example, an article in the Sep. 19, 1997, issue of *Europe Energy* reports that the European Commission regards reducing the energy consumed by electronic equipment in the standby mode of operation as a priority. The article further states that the Commission has concentrated its initial efforts at reducing the standby power consumption of televisions and VCRs, and that it has elicited voluntary commitments from manufacturers of such products to progressively reduce average standby power consumption to less than three watts.

A conventional power supply arrangement for a video display apparatus is disclosed in Japanese laid-open patent document number JP 6-225529. A run mode output stage 2 is coupled to a converter 1 through a switch SW, and a standby mode output stage 3 is inseparably connected to the converter 1. The arrangement disclosed in JP 6-225529 is undesirably inefficient because the standby mode output stage 3 dissipates power during the run mode of operation.

In another conventional power supply arrangement for a video display apparatus, a single power supply circuit is used to implement both standby and run mode operation. When the power supply control circuit senses that the secondary side of the power supply is unloaded, the power supply is placed into a "burst" mode of standby operation, whereby the power supply continues to generate standby voltages for the remote control receiver and the microcontroller.

A disadvantage of this conventional power supply implementation is that the primary inductance of the switched mode power supply transformer is too low for proper standby operation. This low primary inductance results in increased power consumption by the video display apparatus in the standby mode. The reduction in the energy consumed by the video display apparatus during the standby mode of operation dictates either that the pulse width of the drive pulses from power supply control circuit be reduced; or, that the inductance seen by the drive pulses during the standby mode be increased relative to the inductance of the primary winding of the switched mode power supply transformer.

Because of the constraints imposed on the pulse width by the power supply control circuit, it is desirable to increase the inductance seen by the drive pulses during the standby mode, in order to reduce the power consumption of the video display apparatus during the standby mode of operation, preferably to a level equal to or below one watt.

SUMMARY

The present invention is directed to increase the inductance seen by the drive pulses of a power supply control circuit during the standby mode of operation. A switched mode power supply circuit according to the present invention comprises: a run mode power supply for providing an output voltage for the video display apparatus during the run mode of operation; a standby mode power supply for providing an output voltage for the video display apparatus during the standby mode of operation; and a switched mode power supply controller circuit for providing drive pulses to the run mode power supply during the run mode and to the standby mode power supply during the standby mode.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
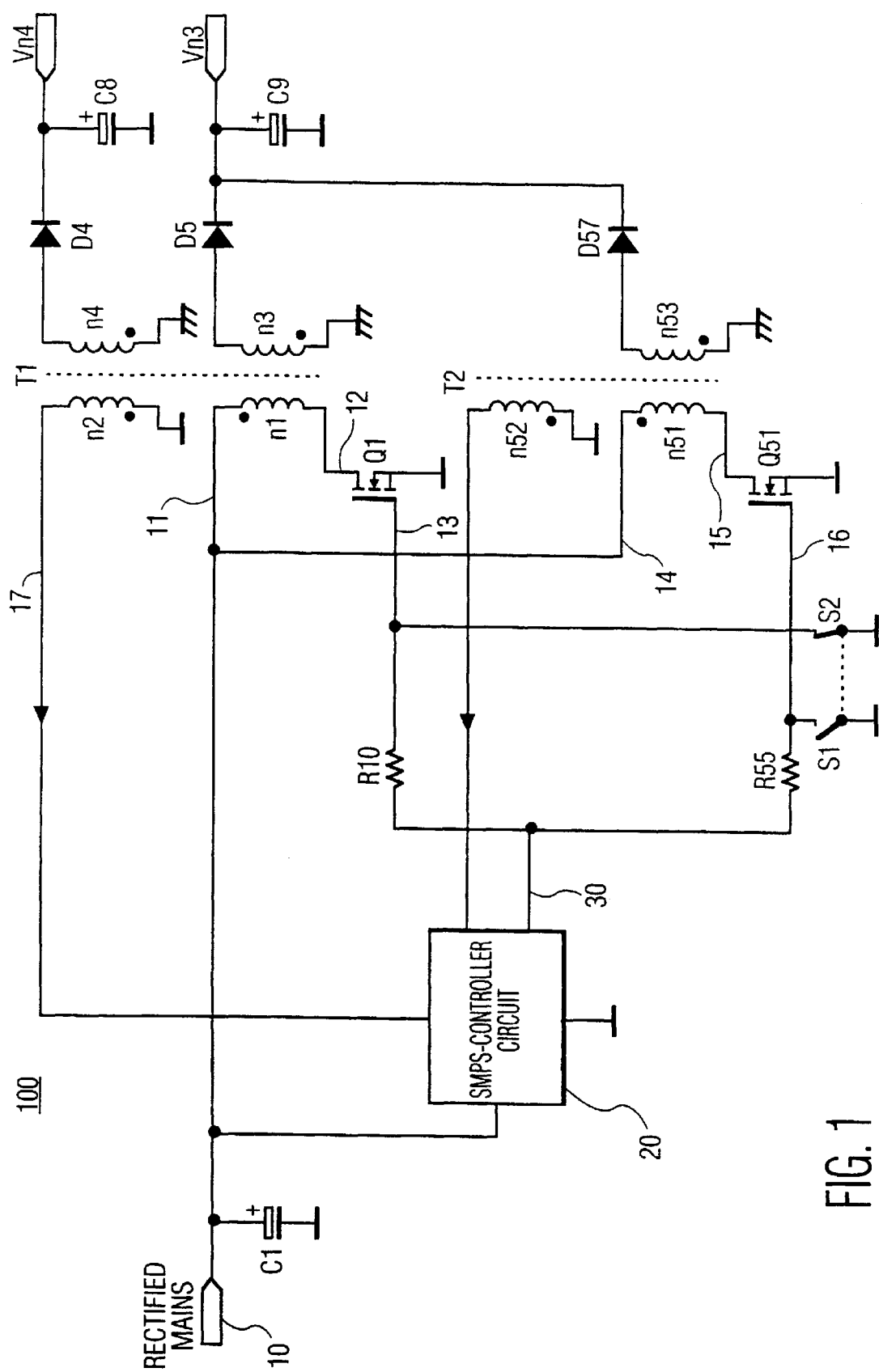
FIG. 1 is a diagram, in block and schematic form, of a standby mode power supply that embodies the present invention.

A dual switched mode power supply circuit 100 shown in FIG. 1 embodies an inventive arrangement for a standby mode power supply for a television receiver. The power supply circuit 100 uses two switched-mode power supplies: a run mode power supply using a flyback transformer T1 and a standby mode power supply using a flyback transformer T2. Run transformer T1 is used during the run mode operation of the television receiver. Run transformer T1 has a primary winding n1 which has a first terminal 11 coupled to the rectified mains voltage 10 and a second terminal 12 coupled to a run power switch Q1. The secondary winding n2 is coupled to the switched mode power supply controller circuit 20, and the secondary windings n3 and n4 provide voltages which, after being rectified by diodes D5 and D4, respectively, are used to power other circuits within the television receiver. For example, the secondary winding n3 is used to power the microcontroller (not shown) and the remote control receiver (not shown) when the television receiver is in the run mode.

The standby transformer T2 is used during the standby mode operation of the television receiver. Standby transformer T2 has a primary winding n51 which has a first terminal 14 coupled to the rectified mains voltage 10 and a second terminal 15 coupled to a standby power switch Q51. The secondary winding n52 is coupled to the switched mode power supply controller circuit 20, and a secondary winding n53 provides a standby voltage which, after being rectified by diode D57, is used to power the microcontroller and the remote control receiver when the television receiver operates in a standby mode.

The run power switch Q1 and the standby power switch Q51 are both controlled by the switched mode power supply controller circuit 20. In the standby mode of operation, the first switch S1 is open and the second switch S2 is closed, as shown in FIG. 1. The control electrode 13 of the power switch Q1 is coupled to the ground, or reference potential, and the power switch Q1 is thus turned off. The drive pulses 30 at the output of the switched mode power supply controller circuit 20 are coupled to the control electrode 16 of the standby power switch Q51 through the resistor R55. As the standby power switch Q51 switches responsive to the drive pulses 30, energy is transferred from the primary winding n51 of the standby transformer T2 to the secondary winding n53. The voltage across the secondary winding n53 is rectified by the diode D57 to provide the voltage Vn3 to the microcontroller and the remote control receiver.

During the run mode operation of the television receiver, the first switch S1 is closed and the second switch S2 is open. Now, the control electrode 16 of the standby power switch Q51 is coupled to the ground, or reference, potential and the standby power switch Q51 is turned off. The drive pulses 30 at the output of the switched mode power supply controller circuit 20 are coupled to the control electrode 13 of the run power switch Q1 through the resistor RIO. As the run power switch Q1 switches responsive to drive pulses 30, energy is transferred from the primary winding n1 of the run transformer T1 to the secondary windings n3 and n4. The voltages across the secondary windings n3 and n4 are rectified by the diodes D5 and D4, respectively, to power other circuits within the television receiver.

Figure 2:
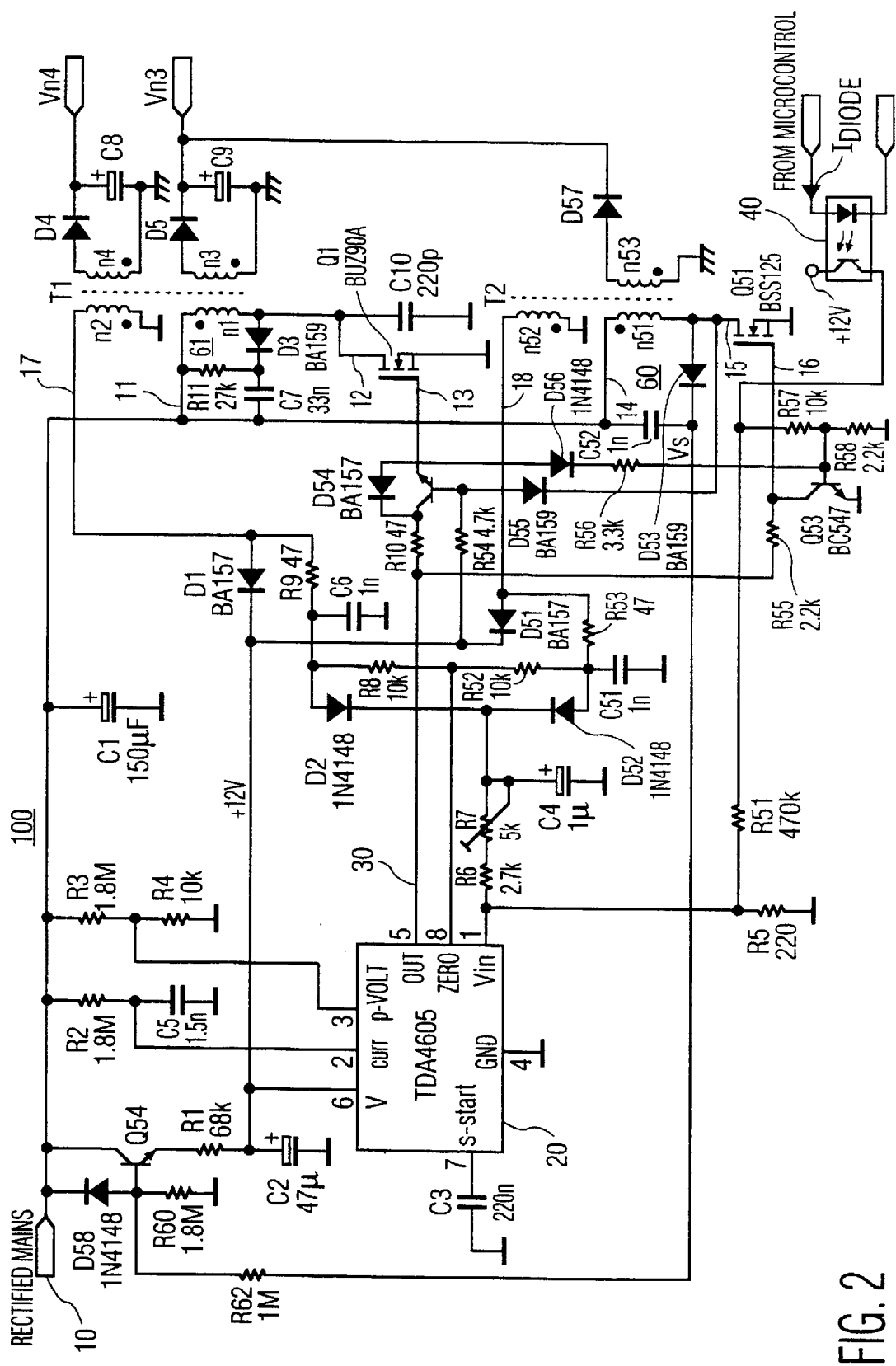
FIGS. 2 and 3 are schematic diagrams of particular implementations of the standby mode power supply of FIG. 1.

FIG. 2 illustrates a presently preferred embodiment of the dual switched mode power supply circuit 100, which uses field effect transistors for the run power switch Q1 and the standby power switch Q51. The run transformer T1 may comprise a conventional design for switched-mode power supply applications, and will not be described further herein. The standby transformer T2 used in the preferred embodiment of FIG. 2 was constructed using an E16 type core with a total air gap of 0.1 mm. The primary winding n51 has approximately 500 turns of 0.1 mm CuN wire (copper wire with nylon insulation). The secondary winding n52 has approximately 60 turns and the secondary winding n53 has approximately 24 turns. Approximately 5 layers of 0.1 mm thickness MYLAR® brand polymeric film provide electrical isolation between the primary winding n51 and the secondary windings n52 and n53.

The inductance of the primary winding n51 is equal to approximately 70 mH, which is relatively large in comparison to the inductance of the primary winding n1 of the run transformer T1. This relatively high inductance is necessary to accommodate the use of the switched mode power supply controller circuit 20 with the standby transformer T2. The reduction in the energy consumed by the video display apparatus during the standby mode of operation dictates either that the pulse width of the drive pulses 30 from the switched mode power supply controller circuit 20 be reduced; or, that the inductance seen by the drive pulses 30 during the standby mode be increased relative to the inductance of the primary winding n1 of the run transformer T1. The relatively high inductance of the primary winding n51 of the standby transformer T2 is used because the drive pulses 30 from the switched mode power supply controller circuit 20 cannot have a pulse width that is smaller than a minimum pulse width. A typical minimum pulse width may equal, for example, approximately one microsecond. Due to the relatively high inductance of the primary winding n51 of the standby transformer T2, the drive pulses 30 have a substantially similar frequency and duty cycle regardless of whether they are applied to the run power switch Q1 in the run mode or to the standby power switch Q51 in the standby mode.

The power supply circuit 100 has a separate feedback path for both the run and standby modes of operation of the television receiver. In the run mode of operation, a voltage at the terminal 17 of the run transformer T1 is fed back to the switched mode power supply controller circuit 20. In the presently preferred embodiment of FIG. 2, the switched mode power supply controller circuit 20 may comprise, for example, a TDA4605 power supply controller integrated circuit manufactured by Siemens Aktiengesellschaft. The following voltages are fed back from terminal 17 of the secondary winding n2 to the controller circuit 20: a supply voltage to pin 6 of the controller circuit 20 through the diode D1; a zero detector voltage to pin 8 of the controller circuit 20 through the resistors R8 and R9 and the capacitor C6; and a regulating voltage to pin 1 of the controller circuit 20 through the resistor R9, the capacitor C6, and the diode D2.

In the standby mode of operation, a voltage at the terminal 18 of the standby transformer T2 is fed back to the switched mode power supply controller circuit 20. The following voltages are fed back from terminal 18 of the secondary winding n52 to the controller circuit 20: a supply voltage to pin 6 of the controller circuit 20 through the diode D51; a zero detector voltage to pin 8 of the controller circuit 20 through the resistors R52 and R53 and the capacitor C51; and a regulating voltage to pin 1 of the controller circuit 20 through the resistor R53, the capacitor C51, and the diode D52.

When the television receiver is in a standby mode of operation, the current $I_{diode}$ flowing through the light-emitting diode of the optocoupler 40 is equal to approximately zero. The transistor Q53 is thus off and the drive pulses 30 from pin 5 of the controller circuit 20 are applied to the control electrode 16, or gate electrode, of the standby power switch Q51. When the drive pulses 30 turn on the standby power switch Q51, the base electrode of the drive transistor Q52 is coupled to the ground, or reference potential, through the diode D55 and the standby power switch Q51; the drive transistor Q52 and the run power switch Q1 are thereby turned off. The voltage at the drain electrode of the standby power switch Q51 can be used in this way to control the drive transistor Q52, and hence the run power switch Q1, because the standby power switch Q51 can switch more rapidly than the run power switch Q1.

As the standby power switch Q51 switches responsive to the drive pulses 30, energy is transferred from the primary winding n51 of the standby transformer T2 to the secondary winding n53. The voltage across the secondary winding n53 is rectified by the diode D57 to provide the voltage Vn3 to the microcontroller and the remote control receiver.

When the television receiver is in the run, or "TV-on" mode, the current $I_{diode}$ flowing through the light-emitting diode of the optocoupler 40 is equal to approximately two milliamps. This turns on the transistor of the optocoupler 40, thereby coupling a supply voltage, equal to approximately +12 V in the preferred embodiment shown in FIG. 2, to the base electrode of the transistor Q53 through the voltage divider formed by the resistors R57 and R58. The transistor Q53 thus turns on, thereby bringing the control electrode 16, or gate electrode, of the standby power switch Q51 to the ground, or reference, potential. The standby power switch Q51 thus turns off and the voltage at the drain electrode of the standby power switch 51 goes to a high level. Consequently, the diode D55 becomes reverse biased and the drive pulses 30 are applied through the resistor R54 to the base electrode of the drive transistor Q52 and through the resistor R10 to the collector electrode of the drive transistor Q52. The drive transistor Q52 then drives the run power switch Q1 responsive to the drive pulses 30. As the run power switch Q1 switches responsive to the drive pulses 30 and the drive transistor Q52, energy is transferred from the primary winding n1 of the run transformer T1 to the secondary windings n3 and n4. The voltages across the secondary windings n3 and n4 are rectified by the diodes D5 and D4, respectively, to power other circuits within the television receiver.

The anode of the diode D56 is coupled to the emitter electrode of the drive transistor Q52 and the cathode of the diode D56 is coupled to a terminal of the resistor R56. The other terminal of the resistor R56 is coupled to the base electrode of the transistor Q53. This series interconnection of the diode D56 and the resistor R56 keeps the transistor Q53 on when the run power switch Q1 is on, thereby ensuring that the standby power switch Q51 does not turn on while the run power switch Q1 is on.

The diode D54 is coupled in parallel with, and oppositely poled to, the drive transistor Q52. The diode D54 and the resistor R10, which couples the output pin 5 of the controller circuit 20 to the collector electrode of the drive transistor 52, provide a path to discharge the gate capacitance of the run power switch Q1, thereby enabling the run power switch to turn off.

When the television receiver is switched from the standby mode to the run mode, the output capacitors, for example the capacitor C8 in FIG. 2, are discharged. When the run power switch Q1 then turns on for the first time in the run mode after the switch from the standby mode, an excessively high peak current may flow through the run power switch Q1, possibly destroying it. The excessively high current is a consequence of the feature of a flyback system that a relatively long time is required to transfer energy from a primary winding of a flyback transformer, for example primary winding n1 of run transformer T1, to a secondary side of the flyback transformer, for example secondary winding n4 of the run transformer T1, if the voltage at the secondary side of the flyback transformer is relatively low.

In order to protect the run power switch Q1 from destruction due to an excessively high peak current flowing through it, a small current is fed to pin I of the controller circuit 20 through the resistor R51. The magnitude of the current is equal to approximately (+12 V /R51), which for the embodiment shown in FIG. 2 is equal to approximately 26 $\mu$A. This current simulates a high feedback voltage at pin 1 of the controller circuit 20, which causes the controller circuit 20 to go into a "no-load" mode or a "burst" mode, whereby the pulse widths of the drive pulses 30 are reduced to their minimum width. The width of the drive pulses 30 increases and eventually returns to a nominal width as the output capacitors become charged.

A snubber circuit 60 formed by the series combination of the capacitor C52 and the diode D53 is coupled in parallel with the primary winding n51 of the standby transformer T2. In a feature of the present invention, the snubber circuit 60 is used to control the current in the start-up resistor R1. During the standby mode of operation of the television receiver, when the controller circuit 20 applies the drive pulses 30 to the control electrode 16, or gate electrode, of the standby power switch Q51, a voltage Vs at the junction of the capacitor C52 and the diode D53 is greater than the rectified mains voltage at the emitter electrode of the start-up transistor Q54. The start-up transistor Q54 is thus off, no current flows through the start-up resistor R1 during the standby mode, and, consequently, the power consumption is reduced during the standby mode. Although not shown in FIG. 2, the snubber network 61 for the primary winding n1 of the run transformer T1 could also be used to turn off the start-up transistor Q54, by coupling a junction of the capacitor C7 and the diode D3 to the start-up transistor through an appropriately valued resistance.

Figure 3:
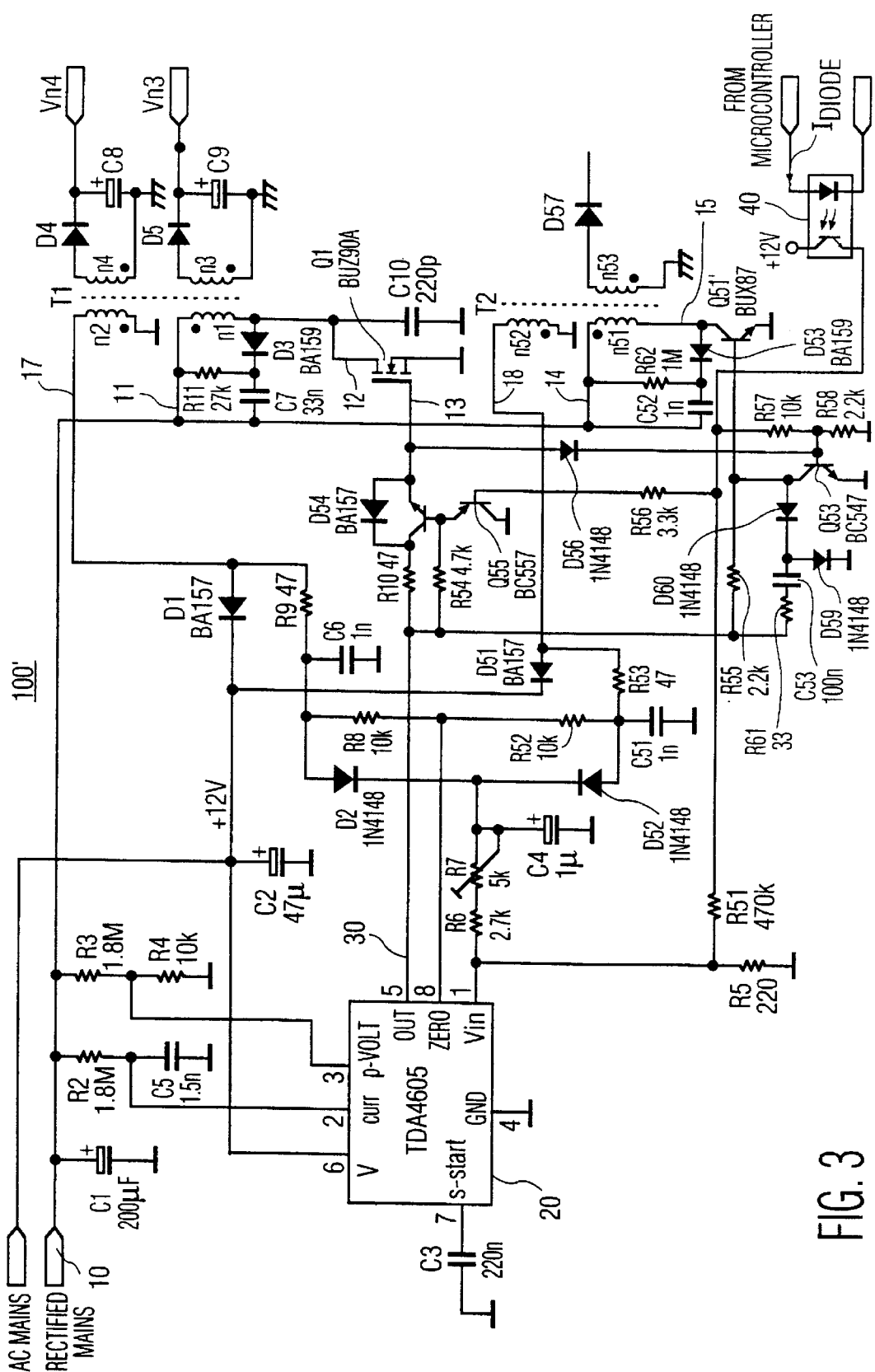

FIG. 3 shows a dual switched mode power supply circuit 100', which uses a bipolar junction transistor for the standby power switch Q51'. Although depicted in FIG. 1 using a field effect transistor, the standby power switch Q51 can be implemented using either a field effect or a bipolar junction transistor, as will be seen in FIGS. 2 and 3. Although not shown in FIGS. 1–3, the run power switch Q1 can also be implemented using a bipolar junction transistor. Using a bipolar junction transistor for the run power switch Q1 would require a different controller circuit 20, for example a TDA4601 power supply controller integrated circuit manufactured by Siemens Aktiengesellschaft; a drive circuit specific to bipolar junction transistors would also be required. Such modifications are well within the purview of one having ordinary skill in the art.

The embodiment shown in FIG. 3 operates substantially in the same manner as the embodiment shown in FIG. 2. One difference between field effect and bipolar junction transistors is that the turn-on time of a bipolar transistor is longer than that for a field effect transistor. Therefore, unlike in the embodiment shown in FIG. 2, wherein the voltage at the drain electrode of the standby power switch Q51 was used to control the drive transistor Q52 and hence the run power switch Q1, the voltage at the collector electrode of the standby power switch Q51' cannot be used to control the drive transistor Q52.

In the embodiment shown in FIG. 3, the drive transistor Q52 is controlled by the optocoupler 40 through the transistor Q55. The drive circuit for the standby power switch Q51 comprises the resistors R55 and R61, the capacitor C53, and the diodes D59 and D60; the operation of this drive circuit is well-known to those having ordinary skill in the art and will not be described further herein. In the standby mode, the transistor of the optocoupler 40 does not conduct, so that the transistor Q53 is off and the standby power switch Q51 is consequently switching responsive to the drive pulses 30 from the controller circuit 20. Concurrently, the transistor Q55 is on, so that both the drive transistor Q52 and the run power switch Q1 are off. Conversely, in the run mode, the transistor of the optocoupler 40 conducts; the transistor Q53 is on and the standby power switch Q51 is consequently off; the transistor Q55 is off; and the drive transistor Q52 drives the run power switch Q1 responsive to the drive pulses 30 from the controller circuit 20.

The present invention, as embodied in the dual switched mode power supply circuits 100 and 100' of FIGS. 2 and 3, advantageously reduces the power consumed by a television receiver operating in a standby mode. For example, assuming a load equal to approximately 200 mW, which approximates a standard microcontroller operating in the run mode, the power consumed by the television receiver may be reduced from approximately six watts to approximately one watt by utilizing the inventive arrangements described herein.

It will be apparent to those skilled in the art that, although the invention has been described in terms of specific examples, modifications and changes may be made to the disclosed embodiments without departing from the essence of the invention. Accordingly, reference should be made to the appended claims, rather than to the foregoing specification, as indicating the true scope of the invention.

What is claimed is:

1. A power supply circuit for an apparatus having run and standby modes of operation, comprising:

a run mode output stage for providing a run mode output voltage during said run mode of operation;

a standby mode output stage for providing a standby mode output voltage during said standby mode of operation; and a control circuit coupled to said run and standby mode output stages for providing drive pulses to only one of said output stages during each of said modes of operation.

2. The power supply circuit of claim 1, wherein said run mode output stage comprises:

a run transformer having a primary winding and providing said run mode output voltage; and a run power switch non-interruptively coupled to said primary winding of said run transformer for controlling the flow of current in said primary winding responsive to said drive pulses.

3. The power supply circuit of claim 2, wherein said run power switch comprises a transistor.

4. The power supply circuit of claim 2, wherein said standby mode output stage comprises a standby transformer having a primary winding which has an inductance sufficient to cause said drive pulses to have a duty cycle in said standby mode of operation which is not less than a minimum duty cycle capable of being provided by said control circuit.

5. The power supply circuit of claim 4, wherein said primary winding has an inductance sufficient to cause said drive pulses to have a frequency in said standby mode of operation which is not less than a minimum frequency capable of being provided by said control circuit.

6. The power supply circuit of claim 1, wherein said control circuit comprises switch means for coupling said drive pulses only to said run power switch during said run mode of operation and only to said standby power switch during said standby mode of operation.

7. The power supply circuit of claim 6, wherein said switch means comprises a first switch for controlling said standby power switch responsive to the mode of operation of said apparatus.

8. The power supply circuit of claim 7, wherein said first switch turns off said standby power switch during said run mode of operation.

9. The power supply circuit of claim 7, wherein said switch means further comprises:

a transistor for providing said drive pulses to said run power switch during said run mode of operation; and a diode having an anode coupled to a control electrode of said transistor and a cathode coupled to said standby power switch, said diode conducting and preventing said transistor from turning on when said standby power switch is turned on.

10. The power supply circuit of claim 9, further comprising a diode having an anode coupled to an output electrode of said transistor and a cathode coupled to a control electrode of said first switch, said diode conducting and preventing said standby power switch from switching during said run mode of operation.

11. A power supply circuit for an apparatus having run and standby modes of operation, comprising:

a source of voltage potential;

a control circuit for providing drive pulses at an output;

a start-up circuit coupling said source to a control input of said control circuit for enabling operation of said control circuit;

a standby transformer having a primary winding and a secondary winding for providing an output voltage (Vn3) during said standby mode of operation; and a snubber circuit coupled to said primary winding of said standby transformer and further coupled to said start-up circuit.

12. The power supply circuit of claim 11, wherein said snubber circuit comprises a series combination of a capacitor and a diode.

13. The power supply circuit of claim 12, wherein said junction of said capacitor and said diode is coupled to said start-up circuit.

14. The power supply circuit of claim 13, wherein a cathode of said diode is coupled to said start-up circuit.

15. The power supply circuit of claim 14, wherein said start-up circuit comprises:

a start-up resistor having a first terminal coupled to said control input of control circuit; and a start-up transistor having a control electrode, a first electrode coupled to said source of voltage potential, and a second electrode coupled to a second terminal of said start-up resistor.

16. The power supply circuit of claim 15, wherein a junction of said capacitor and said diode is coupled to said control electrode of said start-up transistor.

17. A power supply circuit for an apparatus having run and standby modes of operation, comprising:

a control circuit for providing drive pulses at an output;

a run transformer having a primary winding and a secondary winding for providing an output voltage for said apparatus during said run mode of operation;

a run power switch coupled to said primary winding of said run transformer for controlling the flow of current in said primary winding responsive to said drive pulses;

a standby transformer having a primary winding and a secondary winding for providing an output voltage for said apparatus during said standby mode of operation;

a standby power switch coupled to said primary winding of said standby transformer for controlling the flow of current in said primary winding responsive to said drive pulses; and a switch arrangement for coupling said drive pulses exclusively to either said run power switch or said standby power switch during a particular mode of operation of said apparatus.

18. The power supply circuit of claim 17, wherein said switch arrangement comprises a first switch for controlling said standby power switch responsive to the mode of operation of said apparatus.

19. The power supply circuit of claim 18, wherein said first switch turns off said standby power switch during the standby mode of operation.

20. The power supply circuit of claim 19, further comprising:

a transistor for providing said drive pulses to said run power switch during said run mode of operation; and a diode having an anode coupled to a control electrode of said transistor and a cathode coupled to said standby power switch, said diode conducting and preventing said transistor from turning on when said standby power switch is turned on.

21. The power supply circuit of claim 20, further comprising a diode having an anode coupled to a n output electrode of said transistor and a cathode coupled to a control electrode of said first switch, said diode conducting and preventing said standby power switch from switching during said run mode of operation.

22. A power supply circuit for an apparatus having run and standby modes of operation, comprising:

a source of drive pulses, said source providing said drive pulses at an output;

a run transformer for providing an output voltage for said apparatus during said run mode of operation, said run transformer having a run primary winding which has a run primary inductance;

a run power switch coupled to said output and coupled to said primary winding of said run transformer;

a standby transformer for providing an output voltage for said apparatus during said standby mode of operation, said standby transformer having a standby primary winding which has a standby primary inductance which is greater than said run primary inductance; and a standby power switch coupled to said output and coupled to said primary winding of said standby transformer.

23. The power supply circuit of claim 22, wherein said standby primary inductance is sufficient to cause said drive pulses to have a duty cycle in said standby mode of operation which is not less than a minimum duty cycle capable of being provided by said control circuit.

24. The power supply circuit of claim 23, wherein said primary winding has an inductance sufficient to cause said drive pulses to have a frequency in said standby mode of operation which is not less than a minimum frequency capable of being provided by said control circuit.

25. A power supply circuit for an apparatus having run and standby modes of operation, comprising:

a source of voltage potential;

a control circuit for providing drive pulses at an output;

a run mode output stage having a run power switch coupled to said output for providing a run mode output voltage during said run mode of operation;

a standby mode output stage having a standby power switch coupled to said output for providing a standby mode output voltage during said standby mode of operation; and means for controlling said run mode and standby mode power switches responsive to a change in the mode of operation of said apparatus, said controlling means further comprising:

a transistor for providing said drive pulses to said run power switch during said run mode of operation; and a diode having an anode coupled to a control electrode of said transistor and a cathode coupled to said standby power switch, said diode conducting and preventing said transistor from turning on when said standby power switch is turned on.

26. The power supply circuit of claim 25, wherein said controlling means comprises a first switch for controlling said standby power switch responsive to said source of voltage potential.

27. The power supply circuit of claim 26, wherein said first switch turns off said standby power switch during said run mode of operation.

28. The power supply circuit of claim 26, further comprising a diode having an anode coupled to an output electrode of said transistor and a cathode coupled to a control electrode of said first switch, said diode conducting and preventing said standby power switch from switching during said run mode of operation.

* * * * *